US012560139B2

(12) United States Patent
Cheng et al.

(10) Patent No.: US 12,560,139 B2
(45) Date of Patent: Feb. 24, 2026

(54) FUEL FILTER ELEMENT

(71) Applicant: ZHEJIANG WEITAI AUTOMOBILE PARTS CO., LTD., Zhejiang (CN)

(72) Inventors: Jianbin Cheng, Huzhou (CN); Yu Zhang, Huzhou (CN); Qinglin Deng, Huzhou (CN); Xiaowei Ying, Huzhou (CN)

(73) Assignee: ZHEJIANG WEITAI AUTOMOBILE PARTS CO., LTD., Huzhou (CN)

( * ) Notice: Subject to any disclaimer, the term of this patent is extended or adjusted under 35 U.S.C. 154(b) by 430 days.

(21) Appl. No.: 17/957,064

(22) Filed: Sep. 30, 2022

(65) Prior Publication Data

US 2023/0258150 A1 Aug. 17, 2023

(30) Foreign Application Priority Data

Feb. 15, 2022 (CN) .......................... 202220295855.1

(51) Int. Cl.
 F02M 37/34 (2019.01)
 B01D 29/15 (2006.01)

(52) U.S. Cl.
 CPC ............. F02M 37/34 (2019.01); B01D 29/15 (2013.01); *B01D 2201/301* (2013.01)

(58) Field of Classification Search
 CPC ........ F02M 37/34; F02M 37/32; F02M 37/42; B01D 29/15; B01D 2201/301; B01D 29/111; B01D 29/21; B01D 35/153; B01D 35/16; B01D 2201/291
 USPC ....... 210/483, 232, 236, 248, 282, 337, 338, 210/342, 455, 315, 305, 299, 312
 See application file for complete search history.

(56) References Cited

U.S. PATENT DOCUMENTS

| | | | | |
|---|---|---|---|---|
| 2020/0179843 | A1* | 6/2020 | Amaral | ................. B01D 29/13 |
| 2020/0406170 | A1* | 12/2020 | Kollmann | ............ B01D 36/001 |
| 2021/0220763 | A1* | 7/2021 | Chen | ..................... B01D 29/21 |

* cited by examiner

*Primary Examiner* — Madeline Gonzalez
(74) *Attorney, Agent, or Firm* — Ladas & Parry LLP

(57) ABSTRACT

The present application relates to the field of fuel filter components of internal combustion engines, and discloses a fuel filter element, including a filter element main body and a protective cover. A fuel return column extends from an upper end surface of the filter element main body. The protective cover is formed with a U-shaped groove adapted to the fuel return column, is adaptively installed on the filter element main body and is of an annular hollow structure. The U-shaped groove accommodates the fuel return column to form a protective assembly. Therefore, the problem of poor sealing caused by installation deformation damage and installation deviation of the fuel return column, and the cost of a hollow structure of the protective cover are reduced.

4 Claims, 9 Drawing Sheets

4101

401

301

1201

1101

501

511

FUEL FILTER ELEMENT

CROSS-REFERENCE TO RELATED APPLICATION

This application claims priority to Chinese Patent Application No. 202220295855.1 filed on Feb. 15, 2022, the disclosures of which is hereby incorporated by reference in its entirety.

FIELD OF TECHNOLOGY

The present application relates to the field of fuel filter components of internal combustion engines, in particular to a fuel filter element.

BACKGROUND

In general, a fuel filter element is widely used in the field of fuel filtration of internal combustion engines to filter out debris in fuel, and plays a very important role in filtration. There are various fuel filters with different structures and different filtering methods.

In the prior art, according to a conventional fuel filter element, a fuel circulation channel and a working part, as important components in a fuel filtration process, are provided in a cap and integrally connected to a main body, which makes the overall structure more complicated; an adaptive part, namely, a fuel return column is formed by extending upwards from an upper edge of the working cap; an installation error of adaptive parts caused by an inevitable central distance machining error of the structures of the adaptive parts (a central seal hole and the fuel return column, and a central column of an assembly and a fuel return hole) will lead to uneven seal fit gaps and poor sealing; excessive installation deviation will cause deformation damage to the fuel return column, which is not conducive to the protection of the fuel return column; and moreover, a circular plug equipped on the fuel return column is likely to deviate from a slide way when screwed into the slide way of a fuel filter, which is not beneficial to the installation of the fuel filter element.

SUMMARY

In order to solve the problems that a fuel filter element is relatively complex in overall structure, a fuel return column and an upper end surface thereof are not easy to protect, and when the fuel filter element is installed into a filter, a plug is likely to deviate from a track in the prior art, the present application provides a fuel filter element. By designing the relative height of the plug, the fuel return column of the filter can be elastically deformed to a certain degree to adapt to an installation deviation, such that when the filter is installed into an assembly housing corresponding to it, the filter can also be normally installed even if the installation deviation exists, and better sealing is achieved.

To achieve the above objective, the present application is implemented by the following technical solution:

A fuel filter element, including a filter element main body and a protective cover. A fuel return column extends from an upper end surface of the filter element main body. The protective cover is formed with a U-shaped groove adapted to the fuel return column. The protective cover is adaptively installed on the filter element main body, and the protective cover is formed with an annular hollow groove. The U-shaped groove is configured to accommodate the fuel return column to form a protective assembly.

Further, the fuel return column is adaptively provided with a plug.

Further, the plug is provided with a raised edge, and the raised edge is configured to guide the plug to smoothly enter a slide way during replacement and installation of the filter element.

Further, a height of the fuel return column is 20-60 mm.

Further, a movable gap is formed between the fuel return column and an edge of the U-shaped groove.

Further, the fuel return column vertically extends from the upper end surface of the filter element main body.

Further, the filter element main body includes filter paper, a water filtering channel, a water-repellent filtering layer, and a central tube, the filter paper communicates with the water filtering channel, and the water-repellent filtering layer is arranged around the central tube.

Further, the protective cover is in clamped connection with the filter element main body.

The present application further provides a fuel filter element, including a filter element main body and a protective cover. A fuel return column extends from an upper end surface of the filter element main body. The protective cover is formed with an adaptive hole adapted to the fuel return column. The protective cover is adaptively installed on the filter element main body, and the protective cover is formed with an annular hollow groove. The adaptive hole is configured to accommodate the fuel return column to form a protective assembly.

Further, the adaptive hole is circular, U-shaped, or special-shaped.

Further, the fuel return column vertically extends from the upper end surface of the filter element main body.

Further, the filter element main body includes filter paper and a water filtering channel, the filter paper communicates with the water filtering channel, the filter element main body further includes a central tube and a water-repellent filtering layer, and the water-repellent filtering layer is arranged around the central tube; and the fuel return column is adaptively provided with a plug, the plug is provided with a raised edge, and the raised edge is configured to guide the plug to smoothly enter a slide way during replacement and installation of the filter element.

Compared with the prior art, the present application has the following advantages:

The fuel filter element provided by the present application has one advantage that the fuel return column is fully protected from being worn and damaged during continuous use.

The fuel filter element provided by the present application has another advantage that the overall structure is more attractive.

In the present application, due to the design of the relative height of the plug, the fuel return column of the filter can be elastically deformed to a certain degree to adapt to an installation deviation, such that when the filter is installed into an assembly housing corresponding to it, the filter can also be normally installed even if the installation deviation exists, and better sealing is achieved.

The fuel filter element provided by the present application has another advantage that the plug is unlikely to deviate from the track when installed into the filter due to the innovation of the plug in shape.

The fuel filter element provided by the present application has another advantage that the protective cover does not involve in substantive fuel filtration, which reduces the production cost.

BRIEF DESCRIPTION OF THE DRAWINGS

In order to more clearly illustrate the embodiments of the present application or the technical solution in the prior art, the accompanying drawings that need to be used in the description of the embodiments or the prior art will be briefly introduced below. Apparently, the accompanying drawings in the description below merely illustrate some embodiments of the present application. Those of ordinary skill in the art may also derive other accompanying drawings from structures shown in these accompanying drawings without creative efforts.

DETAILED DESCRIPTION

Figure 1:
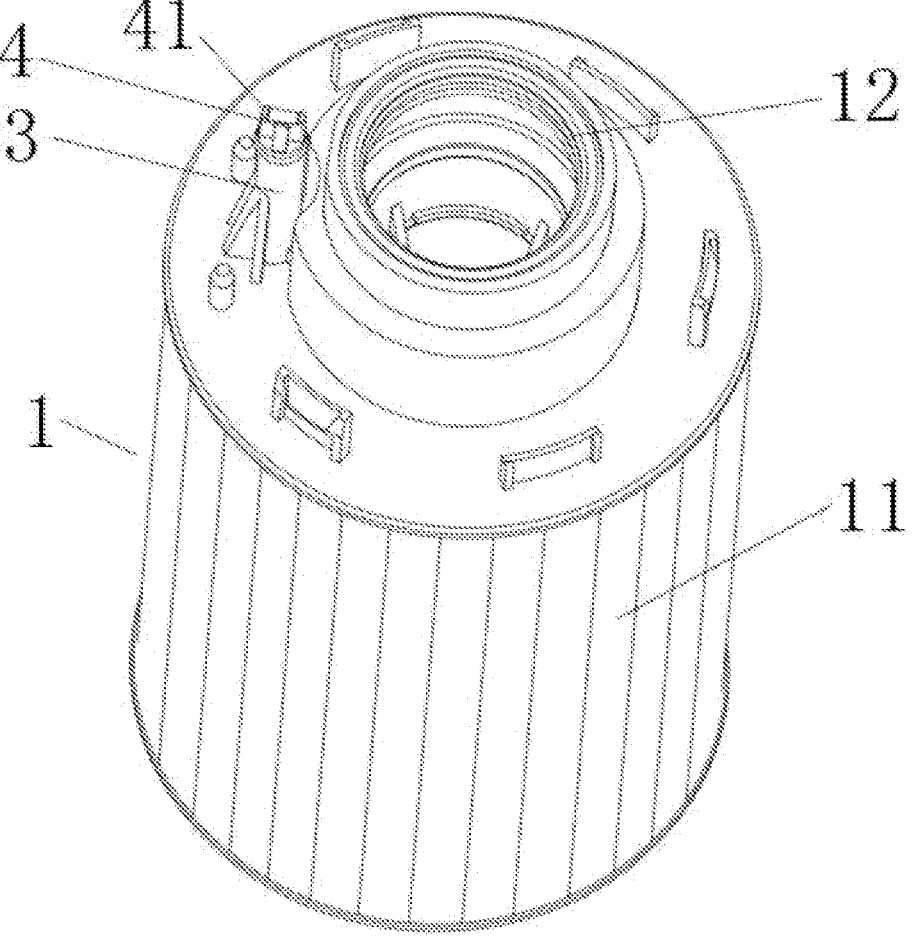
FIG. 1 is a schematic structural diagram of a filter element main body in a first embodiment of the present application.
Figure 2:
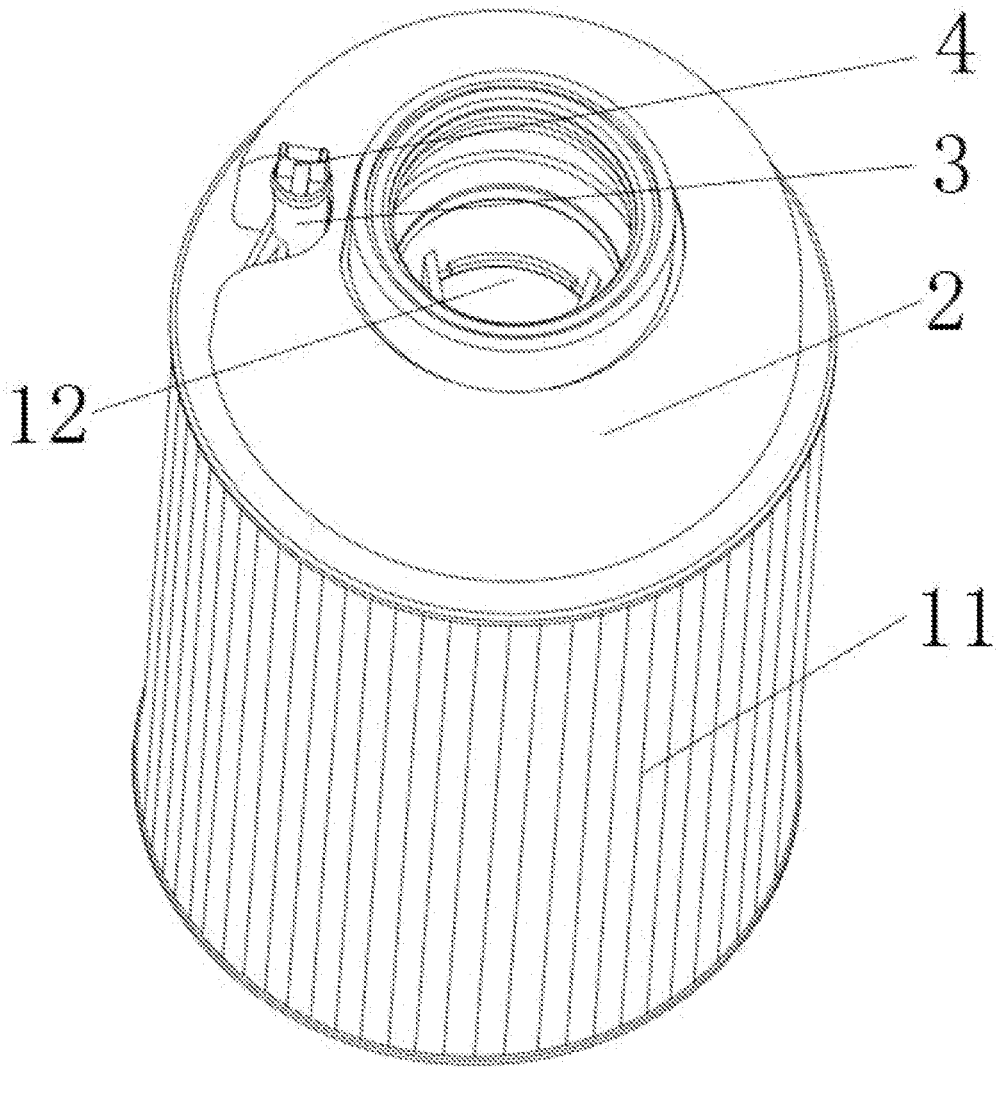
FIG. 2 is an another schematic structural diagram of the filter element main body in the first embodiment of the present application.
Figure 3:
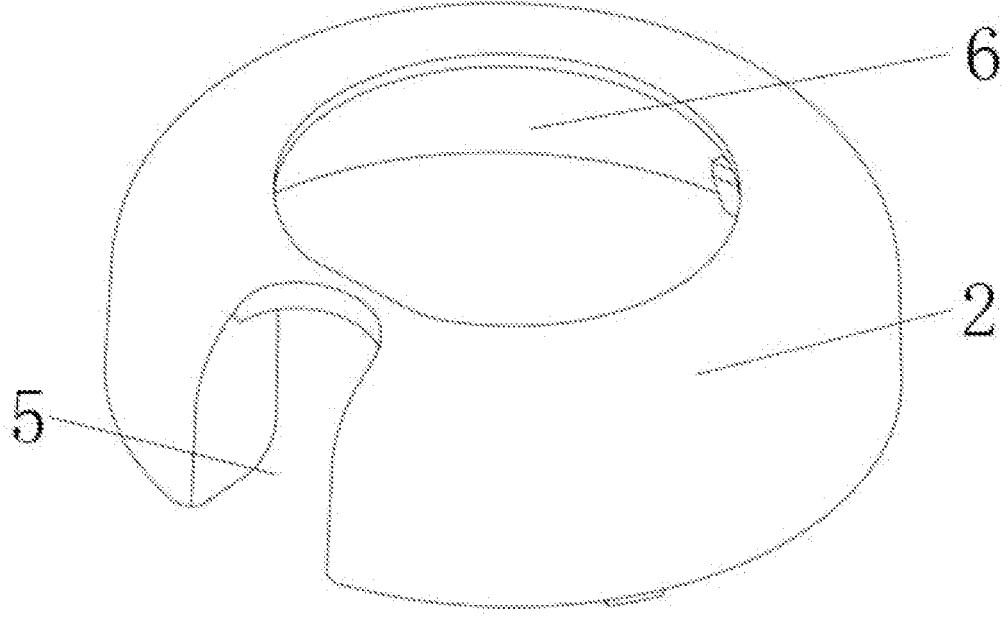
FIG. 3 is a schematic structural diagram of a protective cover in the first embodiment of the present application.
Figure 4:
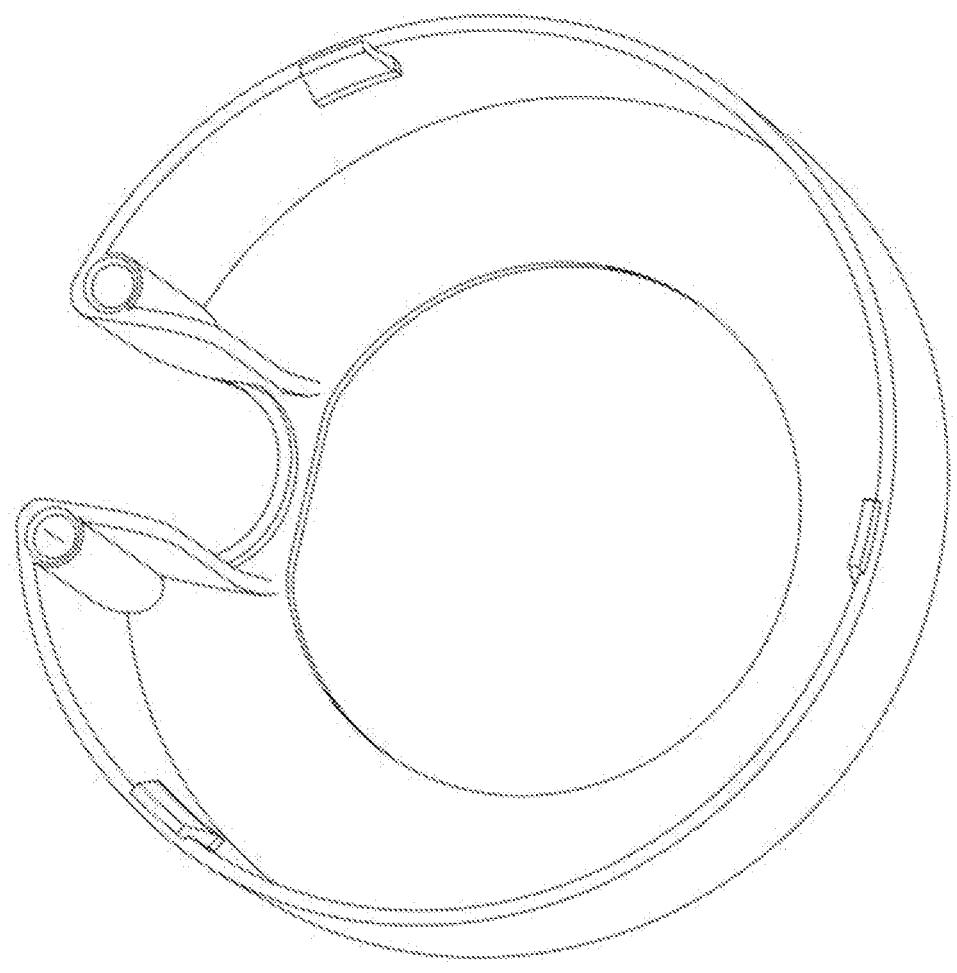
FIG. 4 is an another schematic structural diagram of the protective cover in the first embodiment of the present application.
Figure 5:
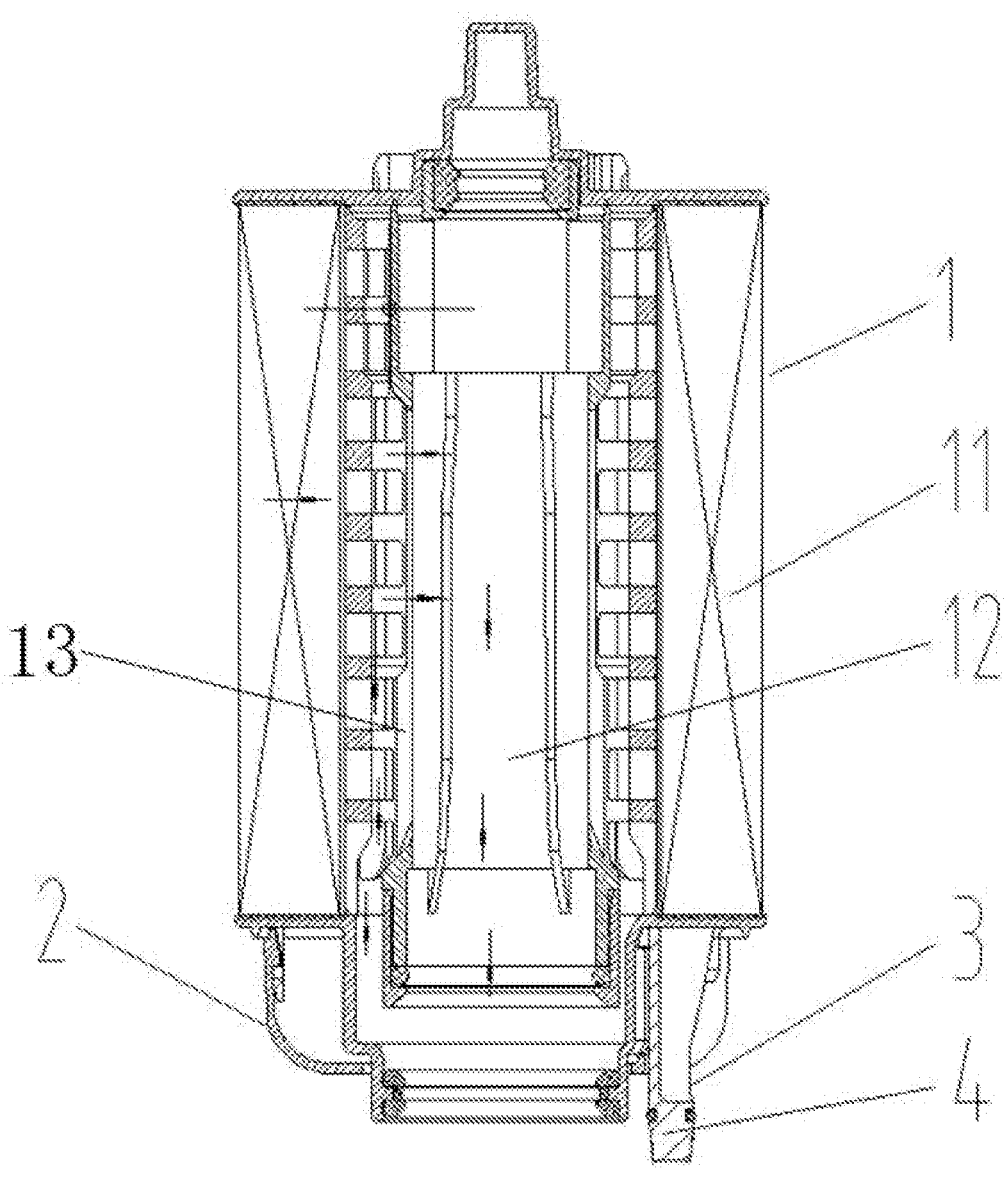
FIG. 5 is a cross-sectional view of a fuel filter element in the first embodiment of the present application.

The embodiments of the present application are described in detail below, and the examples of the embodiments are shown in the accompanying drawings. The embodiments described below with reference to the accompanying drawings are exemplary and intended to explain the present application, and should not be construed as a limitation to the present application.

In the description of the present application, it should be understood that the orientational or positional relationships indicated by the terms "center", "longitudinal", "transverse", "length", "width", "thickness", "upper", "lower", "front", "back", "left", "right", "vertical", "horizontal", "top", "bottom", "inside", "outside", etc. are based on the orientational or positional relationships shown in the accompanying drawings, are only used for the convenience of describing the present application and simplifying the description rather than indicating or implying that the referred device or element must have a specific orientation or be constructed and operated in a specific orientation, and therefore should not be construed as a limitation to the present application.

In addition, the terms "first" and "second" are only used for descriptive purposes, and should not be construed as indicating or implying relative importance or implying the number of indicated technical features. Thus, the features limited with "first" and "second" may explicitly or implicitly include at least one of the features. In the description of the present application, "a plurality of" means at least two, such as two, three, etc., unless otherwise expressly and specifically limited.

In the present application, the terms "installed", "connected", "connection", "fixed", etc. should be understood in a broad sense, unless otherwise expressly specified and limited. For example, it may be a fixed connection, a detachable connection, or integrated; it may be a mechanical connection, an electrical connection, or a mutual communication; and it may be directly connected, indirectly connected via an intermediate medium, an internal connection between two elements, or an interactive relationship between the two elements, unless otherwise expressly limited. Those of ordinary skill in the art may understand specific meanings of the above terms in the present application according to specific circumstances.

Referring to FIGS. 1 to 5 that show an embodiment of a fuel filter element in the present application, in this embodiment, the fuel filter element includes a filter element main body 1 and a protective cover 2. A fuel return column 3 extends from an upper end surface of the filter element main body 1. The protective cover 2 is formed with a U-shaped groove 5 adapted to the fuel return column 3. The protective cover 2 is installed on the filter element main body 1, and the protective cover 2 is formed with an annular hollow groove 6. The U-shaped groove 5 is configured to accommodate the fuel return column 3 to form a protective assembly. Specifically, after the protective cover 2 covers the filter element main body 1, the fuel return column 3 partially enters the U-shaped groove 5 of the protective cover 2 to protect an integral connection part of the fuel return column 3 and the upper end surface of the filter element main body 1.

In this embodiment, a height of the above fuel return column 3 is 20-60 mm. The fuel return column 3 is provided with a plug 4.

During actual use, a filter is installed in an assembly housing. The filter is provided with a central opening and the above fuel return column 3. The assembly housing is provided with structures adaptive to the central opening and the fuel return column of the filter. Due to an inevitable machining error, there will be an installation error between the structures adaptive to the assembly housing. In the present application, due to the design of the relative height of the plug 4, when the filter is installed into the assembly housing corresponding to it, even if an installation deviation exists, the plug 4 will not be deformed in installation and can be better sealed, and it can be installed normally.

A movable gap is formed between the above fuel return column 3 and an edge of the U-shaped groove 5.

The filter element main body 1 includes filter paper 11, a water filtering channel, a water-repellent filtering layer 13, and a central tube 12, the filter paper 11 communicates with the water filtering channel, and the water-repellent filtering layer 13 is arranged around the central tube 12. The fuel return column 3 vertically extends from the upper end surface of the filter element main body 1. The protective cover 2 is in clamped connection with the filter element main body 1.

The plug 4 is provided with a raised edge 41 configured to cooperate with a slide way of a filter when installed into the filter. It is worth mentioning that the plug 4 has an elongated rectangular bulge extending from a cuboid, that is, the raised edge 41. The raised edge 41 is highly fitted with the slide way during the process of installing the fuel filter element into the filter, so it is unlikely to deviate from the slide way.

Specifically, a fuel outlet and a water outlet extend from the upper end surface of the filter element main body 1. Mixed fuel containing water enters from the filter paper 11 to be filtered, filtered fuel enters the water-repellent filtering layer 13 to be filtered while the water cannot pass through the water-repellent filtering layer and is discharged from the water outlet through the water filtering channel, and re-filtered fuel is reused through the central tube 12.

Figure 6:
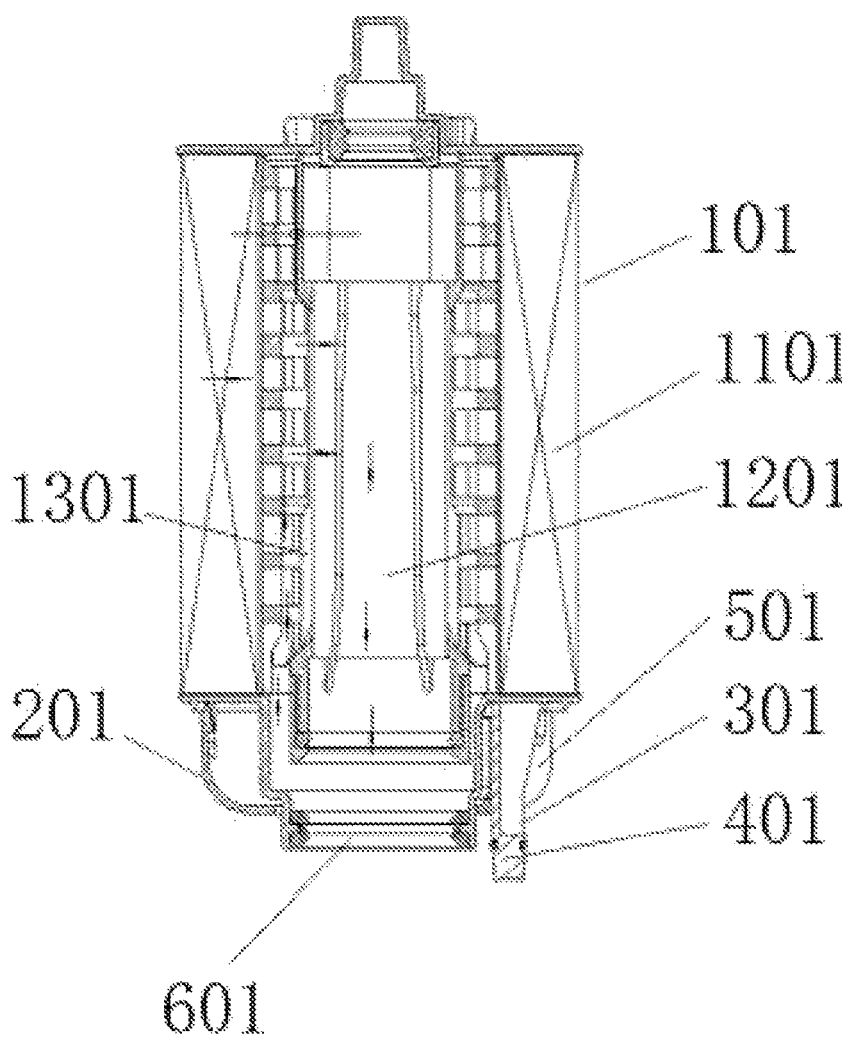
FIG. 6 is a cross-sectional view of a fuel filter element in a second embodiment of the present application.
Figure 7:
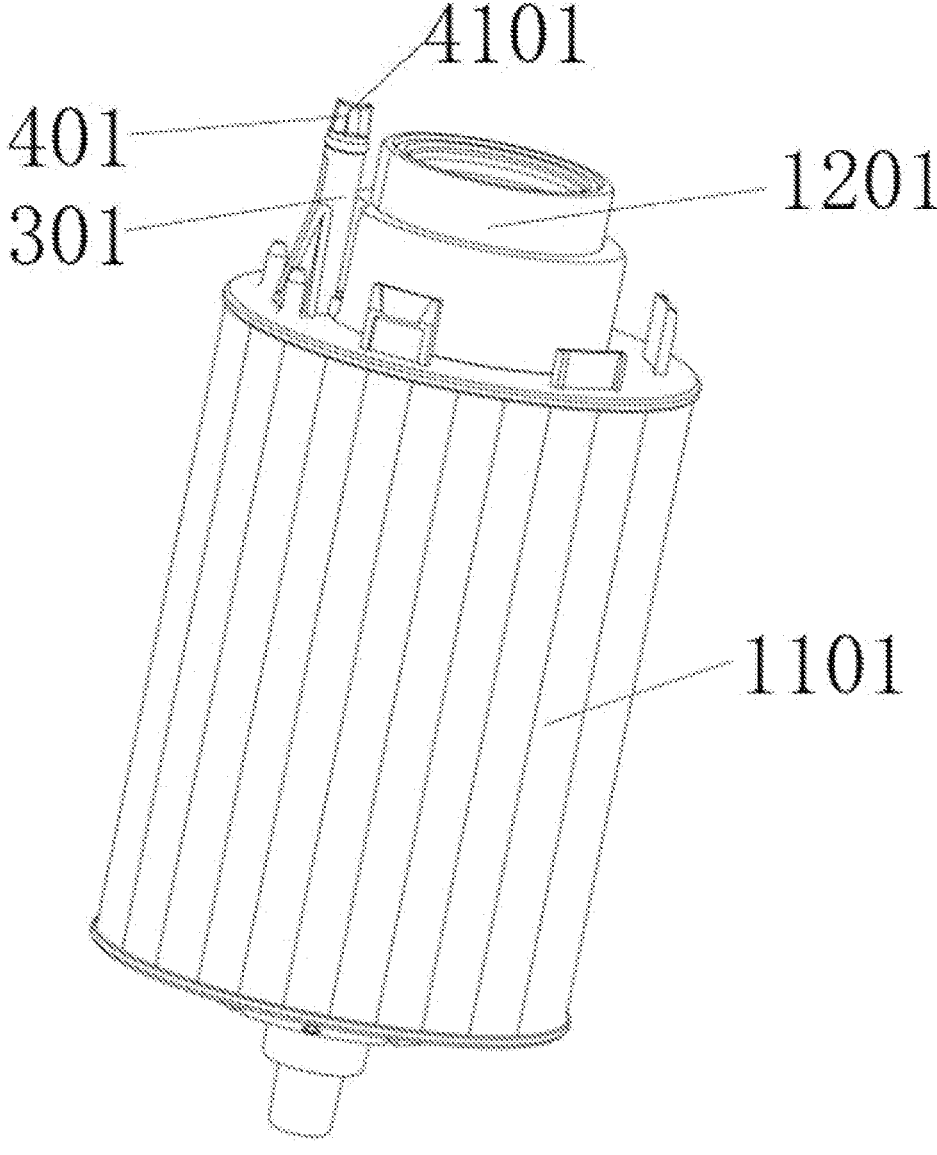
FIG. 7 is a schematic structural diagram of a filter element main body in the second embodiment of the present application.
Figure 8:
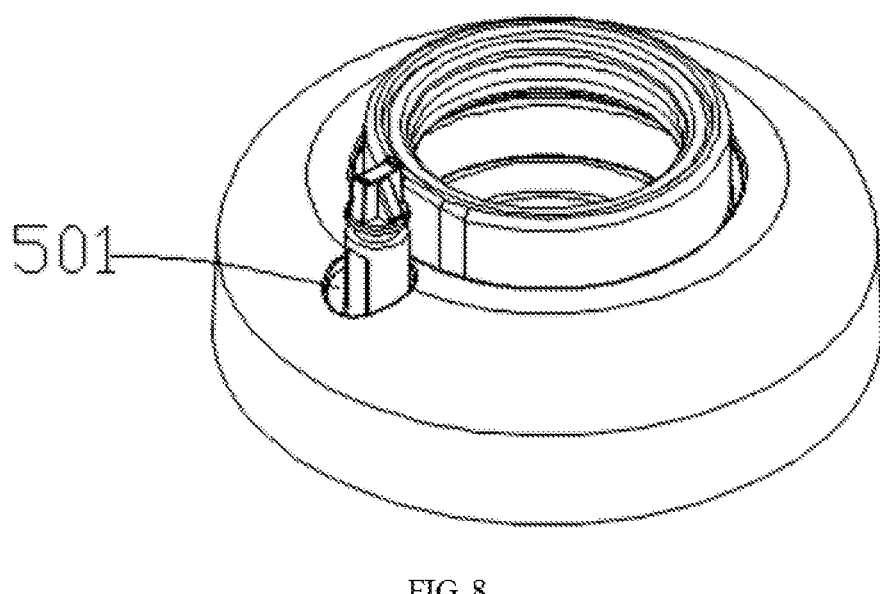
FIG. 8 is a schematic structural diagram of a protective cover in the second embodiment of the present application.

As shown in FIGS. 6 to 8, the present application further provides a fuel filter element, including a filter element main body 101 and a protective cover 201. A fuel return column 301 extends from an upper end surface of the filter element main body 101. The protective cover 201 is formed with an adaptive hole 501 adapted to the fuel return column 301. The protective cover 201 is adaptively installed on the filter element main body 101, and the protective cover 201 is formed with an annular hollow groove 601. The adaptive hole 501 is configured to accommodate the fuel return column 301 to form a protective assembly.

In this embodiment, the adaptive hole 501 is circular or U-shaped.

In this embodiment, the filter element main body 101 includes filter paper 1101 and a water filtering channel, and the filter paper 1101 communicates with the water filtering channel. The filter element main body 101 further includes a central tube 1201 and a water-repellent filtering layer 1301, and the water-repellent filtering layer 1301 is arranged around the central tube 1201. The filter element main body 101 includes filter paper 1101, a water filtering channel, a water-repellent filtering layer 1301, and a central tube 1201 arranged in sequence, the filter paper 1101 communicates with the water filtering channel, and the water-repellent filtering layer 1301 is arranged around the central tube 1201. The fuel return column 301 vertically extends from the upper end surface of the filter element main body 101. The protective cover is in clamped connection with the filter element main body 101. The fuel return column 301 is adaptively provided with a plug 401, the plug 401 is provided with a raised edge 4101, and the raised edge 4101 is configured to guide the plug 401 to smoothly enter a slide way during replacement and installation of the filter element.

Figure 9:
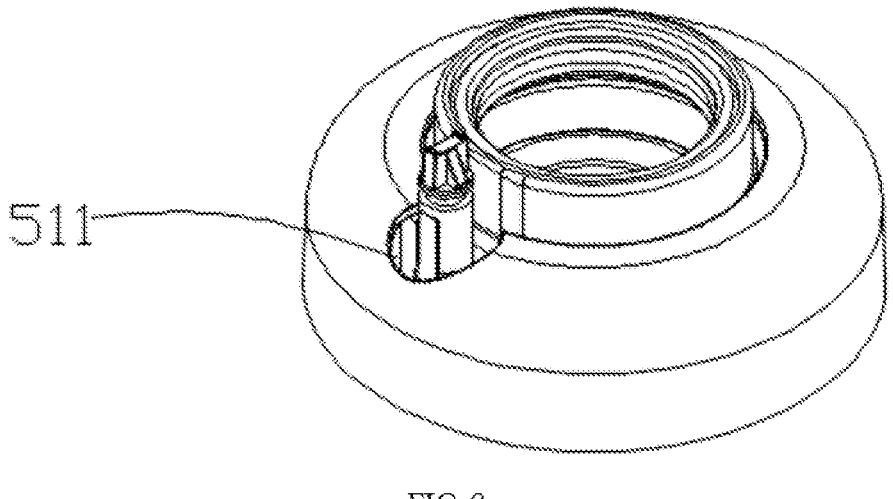
FIG. 9 is a schematic structural diagram of a protective cover in a third embodiment of the present application.

As shown in FIG. 9, in a third implementation, an adaptive hole 511 is of a special-shaped structure.

The technical features of the above embodiments may be combined arbitrarily. For the sake of brevity, all possible combinations of the technical features in the above embodiments are not described. However, the combinations of these technical features should be considered to be within the scope of this specification as long as there is no contradiction between them.

The above embodiments only express several implementations of the present application and are described more specifically and in details, but they should not be construed as a limitation to the scope of the patent of the application. It should be pointed out that those of ordinary skill in the art may also make several modifications and improvements without departing from the conception of the present application, and these modifications and improvements fall within the scope of protection of the present application.

Therefore, the scope of protection of the patent of the present application should be determined by the appended claims.

What is claimed is:

1. A fuel filter element, comprising a filter element main body and a protective cover, a fuel return column extending from an upper end surface of the filter element main body, the protective cover being formed with a U-shaped groove adapted to the fuel return column, the protective cover being adaptively installed on the filter element main body, the protective cover being formed with an annular hollow groove, and the U-shaped groove being configured to accommodate the fuel return column to form a protective assembly;

wherein a top end of the fuel return column is adaptively provided with a plug;

wherein the plug is provided with a raised edge in a form of an elongated rectangular bulge extending from a cuboid, a rectangular end face of the raised edge has two protuberances disposed at opposite sides, and the raised edge is configured to guide the plug to smoothly enter a slide way during replacement and installation of the filter element;

wherein a height of the fuel return column is 20-60 mm; and wherein a movable gap is formed between the fuel return column and an edge of the U-shaped groove.

2. The fuel filter element according to claim 1, wherein the filter element main body comprises filter paper, a water filtering channel, a water-repellent filtering layer, and a central tube.

3. The fuel filter element according to claim 1, wherein the protective cover is in clamped connection with the filter element main body.

4. A fuel filter element, comprising a filter element main body and a protective cover, a fuel return column extending on an upper end surface of the filter element main body, the protective cover being formed with an adaptive hole adapted to the fuel return column, the protective cover being adaptively installed on the filter element main body, the protective cover being formed with an annular hollow groove, and the adaptive hole being configured to accommodate the fuel return column to form a protective assembly;

wherein the adaptive hole is U-shaped;

wherein the filter element main body comprises filter paper and a water filtering channel, the filter paper communicates with the water filtering channel, the filter element main body further comprises a central tube and a water-repellent filtering layer, and the water-repellent filtering layer is arranged around the central tube, and the fuel return column is adaptively provided with a plug, the plug is provided with a raised edge, the plug has an elongated rectangular bulge extending from a cuboid, a rectangular end face of the raised edge has two protuberances disposed at opposite sides, and the raised edge is configured to guide the plug to smoothly enter a slide way during replacement and installation of the filter element;

wherein a height of the fuel return column is 20-60 mm; and wherein a movable gap is formed between the fuel return column and an edge of the U-shaped adaptive hole.

* * * * *